(No Model.)

J. MENDEL.
CAR TRUCK.

No. 602,462. Patented Apr. 19, 1898.

WITNESSES
P. McComb.
E. Seidler.

INVENTOR
Jacob Mendel.
BY
Bary Deemer & Co
ATTORNEYS

UNITED STATES PATENT OFFICE.

JACOB MENDEL, OF NYACK, NEW YORK.

CAR-TRUCK.

SPECIFICATION forming part of Letters Patent No. 602,462, dated April 19, 1898.

Application filed January 7, 1898. Serial No. 665,894. (No model.)

*To all whom it may concern:*

Be it known that I, JACOB MENDEL, a citizen of the United States, and a resident of Nyack, county of Rockland, and State of New York, have invented certain new and useful Improvements in Car-Trucks, of which the following is a specification, reference being had to the accompanying drawings, forming a part thereof, in which similar numerals of reference indicate corresponding parts.

This invention relates to car-trucks adapted for use on single-track trolley-lines.

The object of the invention is to provide a simple and durable device whereby an electric or automobile car traveling in one direction may pass one going in the opposite direction over the same track. Heretofore this feat has only been accomplished by means of a turnout embodying a short section of an additional track and one or more switches connecting it with the main line. This turnout is an additional item of expense and a great source of annoyance to passengers delayed at said turnout in waiting for a car coming in the opposite direction.

The primary feature of the invention is a swinging truck of flat-faced wheels adapted to run the car off the track when another car is met.

A further feature is the employment of auxiliary trucks of flanged wheels adapted to normally keep the car on the track.

Still another feature is the employment of simple and convenient means for controlling said trucks.

The invention will be hereinafter fully described, and specifically set forth in the annexed claims.

Figure 1:
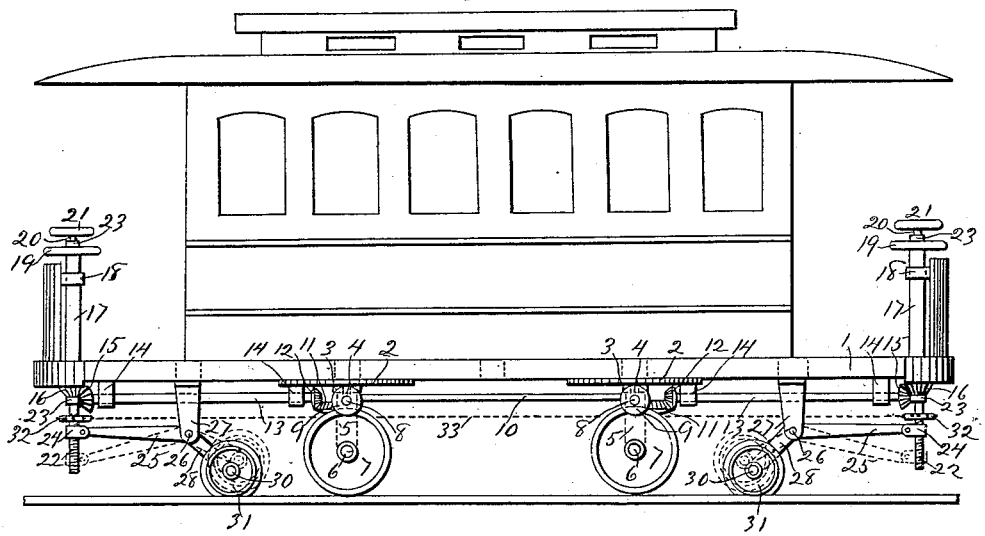
Figure 2:
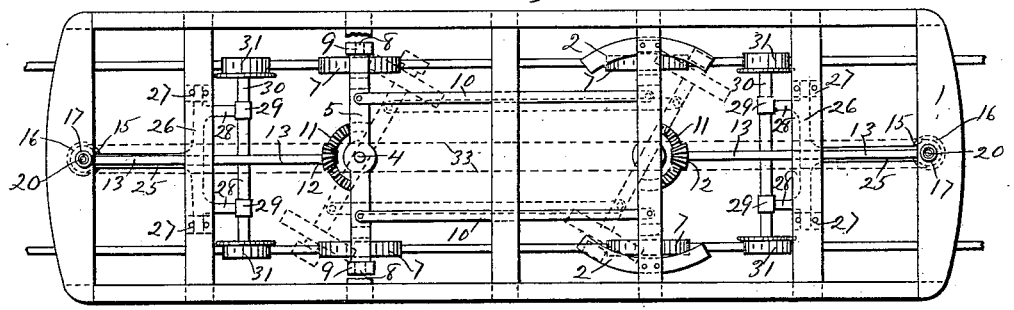

In the accompanying drawings, Figure 1 is a side elevation of the device upon which is mounted an ordinary car. Fig. 2 is a plan view of the same, with the body of the car and the operating hand-wheels removed, only the platform-framework being shown and one of the car-beams being broken away to show the swinging device.

In applying my invention I employ an ordinary car-platform 1, embodying side members and cross-beams. Upon two of said cross-beams are fixed the curved plates 2 2, of metal or other suitable material. To the center of these cross-beams I secure the sockets 3 3. Into these sockets 3 3 are entered the king-bolts 4 4 of the trucks 5 5, comprising the axles 6 6 and flat wheels 7 7. Said axles are mounted in journals of any suitable design. Projecting outwardly from the top of said trucks are the spurs or pins 8 8, upon which the rollers 9 9 are mounted, said rollers being adapted to roll upon the under side of said plates 2 2 to prevent capsizing when the trucks are swung at an angle with the body of the car. The said trucks 5 5 are connected by the parallel rods 10 10, adapted to maintain said axles in parallel relation to each other at all times. Semicircular beveled gears 11 11 are attached to each of said trucks 5 5, one toward each end of the car, and meshing with said semicircular gears are the beveled gears 12 12, mounted upon the shafts 13 13 and turning in suitable journals 14 14, attached to the under side of the platform. Upon the opposite end of these shafts are mounted the beveled gears 15 15, meshing with corresponding beveled gears 16 16, mounted upon the lower end of the hollow shafts 17 17, said hollow shafts 17 17 being mounted upon suitable journals 18 18, attached to the dashboard of the car at a convenient elevation for manipulation by a motorman. Upon the upper end of said shafts 17 17 are fixed the hand-wheels 19 19, by means of which the beveled gears are operated, and through them the trucks are turned. Mounted loosely within said hollow shafts are the spindles 20 20, each surmounted by the hand-wheels 21 21, fixed thereto, by means of which they are operated. The lower ends of said spindles project below the beveled gears 16 16 and terminate in the screws 22 22, said spindles having suitable collars 23 23, fixed thereon to prevent longitudinal motion in the hollow shafts. Said screws 22 22 engage threaded boxes 24 24, pivotally connected with the arms 25 25, which are rigidly connected with the cross-bars 26 26, suitably journaled in supports 27 27, attached to the platform. Rigidly fixed upon said cross-bars 26 26 are arms 28 28, having at their opposite ends suitable journals 29 29, supporting the axles 30 30 of the auxiliary trucks. Upon said axles are fixed the flanged wheels 31 31, adapted for intermittent contact with the rails of the track. Fixed upon said spindles at a point immediately above said screws are the sprockets 32 32, said sprockets being connected by means of the chain 33, whereby both auxiliary trucks may be raised and lowered by the operation of either one of the spindle hand-wheels.

In the operation all the wheels rest upon the rails. When, however, another car is met and it is desired to turn out, allowing it to pass, the hand-wheel 19 is turned by the motorman, thus turning the bevel-gearing and shaft and swinging the central flat-wheel trucks to an angle with the body of the car, as shown by dotted lines in Fig. 2. Then the hand-wheel 21 is turned, thus screwing down the arm 25. The auxiliary trucks, being in fixed relation thereto, are thereby raised from the rails, thus clearing the flanges of the wheels 31 31 from the rails, as shown by dotted lines in Fig. 1, and throwing all the weight of the car upon the flat-wheel trucks, already swung at an angle, said flat wheels being the drivers.

If the car is driven by electricity taken from an overhead wire, the pole is held upon the wire and the current turned on, when the car will run off the track obliquely until far enough to clear its opponent on the track. After the other car has passed the trucks are reswung in the opposite direction and the car run back upon the track, when the auxiliary guiding flanged wheels are again screwed down to the rails and the central trucks again swung in line with the rails. The car may then proceed on its way.

It is obvious that I may use any one of many different constructions of parts in the practice of my invention, not confining myself to the construction shown. Mechanical equivalents may be substituted for any or for all the parts.

Having thus described my invention, what I claim as new, and desire to secure by Letters Patent, is—

1. A swinging truck for cars, comprising two axles and flat-faced wheels, said axles being pivotally connected with the car-platform and maintained in parallel relation to each other by means of parallel rods pivoted thereto, and means for swinging said truck, substantially as shown and described.

2. A swinging truck for cars, comprising two sets of flat-faced wheels and their axles, said axles pivotally connected to the car-platform and being connected with each other by means of the parallel bars, and projecting spurs carrying rollers adapted to roll upon the under side of the car-platform, substantially as shown and described.

3. A swinging truck for cars, comprising two sets of flat-faced wheels and axles, said axles pivotally connected to the car-platform and being connected with each other by means of parallel bars, projecting spurs carrying rollers and curved metallic plates fixed to the under side of the car-platform and upon which said rollers are adapted to work, substantially as shown and described.

4. A swinging truck for cars, comprising two sets of flat-faced wheels and axles, said axles pivotally connected to the car-platform and being connected with each other by means of parallel bars, projecting spurs carrying rollers adapted to roll on the under side of the car-platform and beveled gearing adapted to swing said trucks at the will of the operator, substantially as shown and described.

5. Trucks for cars of the class described, comprising two sets of flanged wheels and their axles, said axles adapted to be raised and lowered by means of levers operated by screws, means for connecting said operating-screws, and swinging trucks comprising two sets of flat-faced wheels and axles, said axles pivotally connected to the car-platform and being connected to each other by means of parallel bars, projecting spurs carrying shoulders adapted to roll on the under side of the car-platform, and means for swinging said trucks, substantially as shown and described.

6. A trolley or automobile car comprising a car-platform and superstructure, swinging trucks pivotally connected to said car-platform, said trucks maintained in parallel relation to each other by means of parallel bars, means for operating the same, and auxiliary trucks adapted to be raised and lowered from and to the rails, and means for operating same, substantially as shown and described.

7. A trolley or automobile car, comprising a platform and superstructure, swinging trucks pivotally connected to said platform and maintained in parallel relation to each other by means of parallel rods, beveled gearing adapted to operate said trucks and auxiliary trucks having flanged wheels and operating by means of a lever and screw, substantially as shown and described.

8. A trolley or automobile car, comprising a platform and superstructure, swinging trucks having flat-faced wheels pivotally connected to said car-platform and maintained in parallel relation with each other by means of parallel rods, beveled gearing adapted to operate said swinging trucks and auxiliary trucks having flanged wheels and being operated by means of levers and screws and sprocket-wheels, and an endless chain connecting said operating-screws, substantially as shown and described.

In testimony that I claim the foregoing as my invention I have signed my name, in presence of two witnesses, this 27th day of December, 1897.

JACOB MENDEL.

Witnesses:
NICOLAUS MORTEN PIERSON,
W. O. POLHEMUS.